Feb. 19, 1952 — L. J. WEBER — 2,586,408
BAFFLE FOR TUBE ASSEMBLIES
Filed May 20, 1946
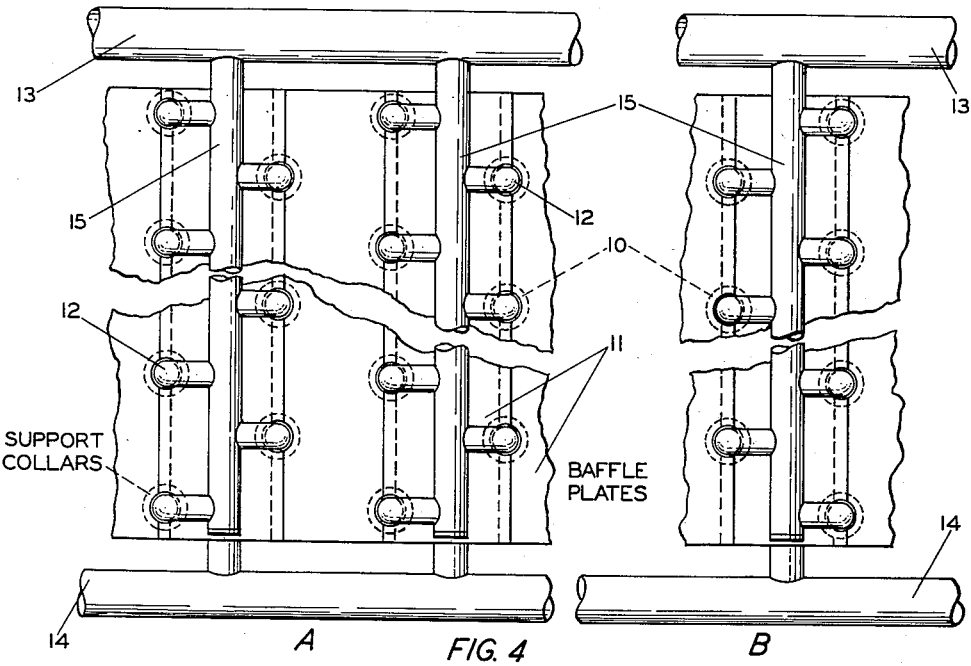
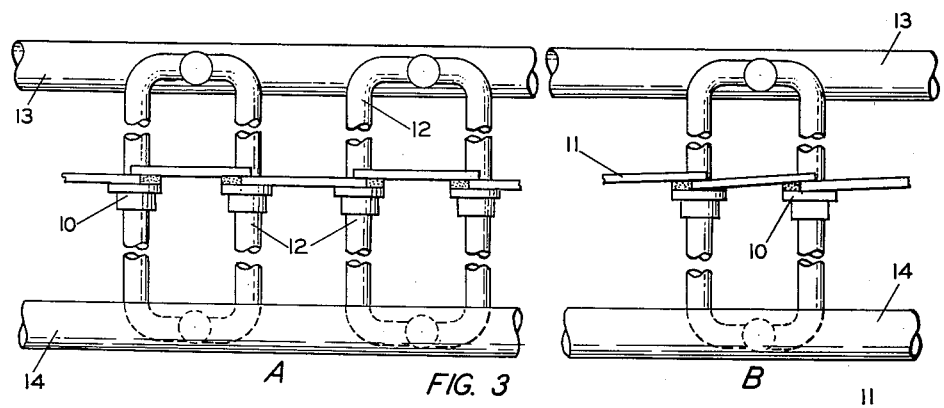
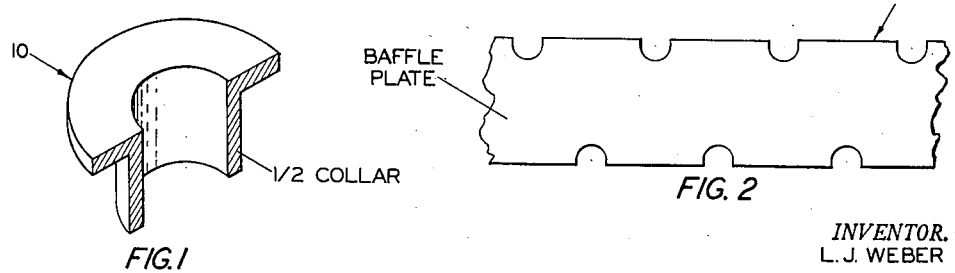
INVENTOR.
L. J. WEBER
BY Hudson and Young
ATTORNEYS Patented Feb. 19, 1952

2,586,408

UNITED STATES PATENT OFFICE 2,586,408

BAFFLE FOR TUBE ASSEMBLIES

Louis J. Weber, Bartlesville, Okla., assignor to Phillips Petroleum Company, a corporation of Delaware Application May 20, 1946, Serial No. 671,107

4 Claims. (Cl. 23—288)

This invention relates to baffles or dividing plates for use in tube assemblies. In one particular aspect it relates to an improved design of baffle plates and in another particular aspect it relates to an improved method of installing and supporting such baffle plates in a tube assembly.

Baffle plates are extensively used to control the path of hot gases passing over tube assemblies in catalyst cases, boilers, heaters and similar equipment. Conventionally, baffles for such assemblies are made of heavy castings or refractory materials. Such baffles are very heavy and require heavy beams for their support over long spans. Refractory baffles must be formed or cast in place around tubes in an assembly and can be used only once; replacement with new material is necessary if the baffle is removed to permit work on tubes. Cast baffles are very difficult to install and remove. Tube assemblies are also frequently subject to vibration, movement and expansion. With cast baffles or baffles formed in situ from refractory materials, it is not possible to have tight seals around the tubes of the assembly and still allow much freedom of tube movement.

In certain applications such as in catalyst cases of the sort described in the copending application of McCullough, Dolezal, Hays and Hachmuth, Serial No. 540,676, filed June 16, 1944, now abandoned, and the continuation-in-part thereof Serial No. 762.314, filed July 21, 1947, extreme temperature variations and resulting tube expansion and movement occur. In such installations variations in temperature of approximately 1400° F. are sometimes encountered in a routine operation. Under such operating conditions, cast baffles and baffles formed from refractory materials sag, fail, grow by deposit of oxidation products, and bind, distort and break tubes of the assembly.

A lightweight, demountable baffle which is capable of automatically adjusting itself to compensate for expansion and tube movement while maintaining a substantially gas tight seal around tubes of an assembly is a highly desirable and hitherto unknown improvement.

It is an object of this invention to provide a baffle for a tube assembly which may be supported by the tubes contained in said assembly.

A further object is to provide a baffle for a tube assembly which automatically adjusts itself to compensate for expansion and contraction of the baffle and to compensate for tube movement due to expansion of tubes and headers of such tube assembly, while maintaining a substantially gas tight seal aroud the tubes in said assembly.

Another object is to provide a baffle for a tube assembly which may be easily and rapidly assembled and disassembled and which may be used repeatedly.

Another object is to provide a baffle which is simple, rugged and cheap in construction and which has the particular advantageous arrangement and combination of parts shown.

Other objects and advantages will become apparent to those skilled in the art as this disclosure proceeds.

I have found that an effective baffle may be constructed by attaching collars to the tubes of such assembly and supporting a plurality of specially designed lightweight plates thereon in the manner hereinafter described.

Although my invention is operative and applicable to any tube assembly requiring a baffle, it is especially useful in tube installations designed to be subjected to extreme variations in temperature, vibration, or movement of tubes due to expansion and contraction of headers, etc., and in which preservation of a substantially gas tight seal around the tubes is desirable.

Drawings

In the accompanying drawings which show diagrammatically two particular embodiments of my invention, Fig. 1 shows a half collar in perspective, Fig. 2 is a plan of one of the plates used in said embodiment, Fig. 3 is a side elevation of a tube assembly with baffle in place and is divided into two parts: A, showing one arrangement of plates, and B, showing a second arrangement; and Fig. 4 is a plan of tube assembly and baffle showing the same two arrangements of plates. Like reference numerals apply to like parts throughout the various figures of the drawings.

Fig. 2 shows a plan of an individual plate 11 used in forming my baffle. Plate 11 is flat and has cutout indentations in its edges adapted to receive the tubes of adjacent rows of tubes in the assembly. The cutout indentations are adapted to fit loosely on and partially encircle said tubes and are of sufficient depth to permit the edges of plates 11 to extend beyond the centerline of said tubes.

The complete baffle is constructed as shown in Figs. 3A and 4A in which tubes 12 are shown attached to cross headers 15 which are in turn attached to inlet header 13 and outlet header 14. A pair of half collars 10 is attached to each tube 12 of the assembly to form supporting collars having their flanges lying in the same plane at correct height for supporting baffle plates. Section A of Figs. 3 and 4 shows a plurality of plates 11 are then laid in alternate spaces between rows of tubes with cutout indentations in the edges of each plate partially encircling tubes of adjacent rows. Other similar plates are then laid in the alternate spaces between rows of tubes left vacant as a result of such placement of plates and are disposed with their edges overlapping and supported by the plates first installed, and complete the encirclement of each tube. Such placement results in a series of plates in which adjacent plates lie in different planes, namely an upper plane and a lower plane, with the edges of each plate overlapping the edges of adjacent plates, and in substantially gas tight contact therewith. Substantially gas tight joints are formed by contact of plates in said lower plane with a portion of a flange of each collar. That portion of each collar not overlaid by a plate in said lower plane is built up with insulating cement or refractory material, as shown in Fig. 3, to make contact with a plate in the upper plane. By disconnecting top and bottom cross headers and removing only three baffle plates a complete section of tubes with a top and bottom cross header may be lifted out of the assembly for repair or replacement.

The modified arrangement of plates shown in sections B of Figs. 3 and 4 is especially useful where a gas is passed over a baffle at high velocity. In this arrangement one edge of each plate rests upon collars attached to tubes of the assembly and the opposite edge of the plates rests upon an edge of the next plate. The plates thus are sloped up in the direction of gas flow and high velocity of gases passing over the baffle cannot raise a baffle plate from its seat, but on the other hand does exert a pressure on the plates tending to force them firmly down upon their supports.

The width of plates 11 and the flanges of half collars 10 may be varied as desired to give any degree of overlapping which may be necessary. I have found that a plate width sufficient to give an overlap of about one inch at the edges is sufficient for most installations. I have also found that a width of collar flange of about 1½ inches is sufficient for providing support and maintaining substantially gas tight seals under most operating conditions.

Plates 11 may be formed of any material suitable for the temperatures encountered in use. Best results are received by the use of materials which do not grow by deposit of oxidation products at the temperatures expected to be encountered. For low temperature installations aluminum plates may be used; for temperatures up to about 1400° F. stainless steels, such as 12 chrome steel, may be used; and for temperatures from 1400° F. to 2000° F., 25 to 30 chrome stainless steels are desired. For very high temperatures the plates may be formed of light refractory blocks with their interstices filled with refractory cement.

Advantages

This baffle has many advantages. The multiplicity of points of support effectively prevents the baffle plates from sagging and becoming deformed during operation, so that light weight plates may be used. Light weight plates may be formed from heat resistant alloys, such as stainless steels, as cheaply as conventional cast baffles and do not require the heavy bracing necessary for the support of cast baffles. A particular advantage resulting from the multiple support and lightweight features of this baffle is that expensive alloys, such as stainless steels, may be used and thereby difficulties in operation due to growth of the baffle by deposit of oxidation products may be eliminated. Use of expensive alloys in baffles of conventional cast construction is usually not commercially feasible.

The half collars can be quickly and easily located on the tubes either in the fabricator's shop or in the field. Welded to the tubes they become an integral part thereof and cooperate with refractory sealing material to maintain a substantially gas tight seal around the tube. Apertures in refractory baffles for the passage of tubes usually become enlarged and permit considerable passage of gas therethrough. Cast baffles are not manufactured to close tolerances and cannot fit tubes closely enough to prevent considerable gas leakage.

Baffles constructed in accordance with my invention are not subject to damage by vibration, movement or expansion of the tubular elements of the assembly since the plates are not fastened to any part of the tubes and the indentations in the edges of the baffle plates fit the tubes loosely enough to permit the tubes to move. Such a baffle does not distort tubes. Refractory baffles are often cracked by vibration and movement of tubes. Cast baffles often break tubes of an assembly by restricting their movement. My invention permits substantial movement of tubes in response to expansion of headers.

My invention provides a baffle which may be easily and quickly assembled. The plates of this baffle may be removed at any time when it becomes necessary to change tubes or dismantle the unit and they are not damaged by repeated insertions and removals, whereas conventional refractory baffles can be used but once.

Cast or refractory baffles are so heavy as to place undue strain on tubes when attempts are made to support such baffles by means of the tubes of an assembly. It is usually necessary to support such baffles by heavy beams which restrict the movement of the baffles. Support of such baffles by beams either leaves considerable areas of the baffle unsupported with resulting tendency to sag and drop or increases the size of the installation by necessitating an arrangement of tubes which will allow multiplicity of supporting beams. All such disadvantages are overcome by the use of my invention.

Example

A large commercial butadiene plant is equipped with 72 catalyst cases approximately 10 x 15 feet. Within these cases 3⅝ inch catalyst tubes are disposed as shown in Fig. 4 in rows approximately 9 inches apart, center-to-center distance. In routine operation these tubes are subjected to a temperature change of approximately 1400° F. at one point. Movement of tubes due to expansion of headers amounts to 1 to 1½ inches during this operation. A baffle is required for directing heating and cooling gases in their path over these tubes.

Conventional commercial baffles of a special grade of cast iron were installed. These baffles were unsatisfactory in service because of extensive breakage, sagging and growth at high temperatures. In a 10-foot length of this commercial baffle, growth of the baffle by oxidation deposits was found to amount to as much as 3 inches in 9 months of use and tubes of the assembly were distorted by such accumulation of oxidation products. Expense of maintenance and replacement of these baffles amounted to more than $800 per month.

A number of such baffles were replaced by others constructed according to the principles of my invention. In these replacement baffles, plates having the plan shown in Fig. 2 were used. These plates were punched from 10-gauge steel of the grade sold as "#410 A1SI Stainless" and had an overall width of around 8½ inches, sufficient to give an overlap of about one inch at each edge. The supporting collars on each tube of the assembly had flanges about 1½ inches wide.

All baffle troubles have been overcome by the use of these baffles. The remaining catalyst cases of this group are being equipped with baffles constructed according to my invention as speedily as is practical.

Many obvious changes in construction may be made in this baffle. For instance full collars may be used instead of the half collars shown. Full collars are particularly adapted for use in the fabricator's plant, but lack the convenience of half collars in field use. It is to be understood that the forms of the invention, herewith shown and described, are to be taken as preferred examples of the same and obvious changes in shape, size and arrangement of parts may be made without departing from the spirit of the invention which is defined and solely limited by the subjoined claims.

I claim:

1. In a catalyst case comprising a series of rows of vertical catalyst tubes connected at their upper ends to an upper series of cross header tubes and at their lower ends to a lower series of cross header tubes so as to form two parallel spaced-apart rows of tubes connecting each pair of upper and lower headers, said upper series of cross header tubes being connected to a first conduit and said lower series of header tubes being connected to a second conduit, said arrangement providing for flow of fluids through said catalyst tubes from one of said conduits to the other: a baffle assembly comprising collars fixed on each of said catalyst tubes in a common plane intermediate said headers; a series of flat plates slidably supported on said collars and extending across said case between adjacent rows of said catalyst tubes, said plates being notched to fit loosely around said catalyst tubes and slidably overlapped along their edges so as to form a continuous and gas-tight slidably-expansible baffle across said case, said structure avoiding stress on said tubes and on said plates upon expansion and contraction of the tube and baffle structure and permitting removal of a pair of rows of said tubes with their cross headers by removal of only the baffles adjacent said last-named tubes.

2. The apparatus defined by claim 1 in which alternate plates overlap their adjacent plates.

3. The apparatus defined by claim 1 in which each plate overlaps the next succeeding plate.

4. The apparatus defined by claim 1 in which said collars have a flange on the upper edge thereof to provide additional supporting surface for said plates.

LOUIS J. WEBER.

REFERENCES CITED

The following references are of record in the file of this patent:

UNITED STATES PATENTS

| Number | Name | Date |
|---|---|---|
| 527,729 | Sewell | Oct. 16, 1894 |
| 1,231,896 | Jacobus | July 3, 1917 |
| 1,563,567 | Harter | Dec. 1, 1925 |
| 1,602,678 | Kent | Oct. 12, 1946 |